(12) United States Patent
Yamamoto et al.

(10) Patent No.: US 8,199,122 B2
(45) Date of Patent: *Jun. 12, 2012

(54) PRESSURE SENSITIVE CONDUCTIVE SHEET, METHOD OF MANUFACTURING THE SAME, AND TOUCH PANEL USING THE SAME

(75) Inventors: Yasutaka Yamamoto, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 440 days.

This patent is subject to a terminal disclaimer.

(21) Appl. No.: 12/428,047

(22) Filed: Apr. 22, 2009

(65) Prior Publication Data

US 2009/0207051 A1 Aug. 20, 2009

Related U.S. Application Data

(63) Continuation of application No. 11/313,197, filed on Dec. 20, 2005, now Pat. No. 7,595,790.

(30) Foreign Application Priority Data

Jan. 31, 2005 (JP) ................................. 2005-022422

(51) Int. Cl.
  *G09G 5/00* (2006.01)
(52) U.S. Cl. ..................... 345/173; 428/323; 178/18.05; 178/18.06; 178/18.07; 463/37
(58) Field of Classification Search .................. 345/173; 359/265; 428/209, 323; 178/18.01–18.07; 178/19.03–19.04; 463/37
See application file for complete search history.

(56) References Cited

U.S. PATENT DOCUMENTS

| 4,448,837 | A |   | 5/1984 | Ikeda et al. |
| 4,458,128 | A |   | 7/1984 | Chabinsky |
| 4,548,862 | A | * | 10/1985 | Hartman ....................... 428/323 |
| 4,644,101 | A |   | 2/1987 | Jin et al. |
| 4,731,282 | A | * | 3/1988 | Tsukagoshi et al. .......... 428/220 |
| 4,789,646 | A |   | 12/1988 | Davis |
| 4,960,612 | A | * | 10/1990 | Dentini et al. ................ 427/550 |
| 5,522,962 | A | * | 6/1996 | Koskenmaki et al. ..... 156/272.4 |
| 5,948,515 | A |   | 9/1999 | Tsunekawa |
| 6,310,614 | B1 |   | 10/2001 | Maeda et al. |
| 7,071,722 | B2 |   | 7/2006 | Yamada et al. |
| 2004/0151895 | A1 |   | 8/2004 | Itoh et al. |
| 2006/0134378 | A1 |   | 6/2006 | Kimura et al. |
| 2006/0176064 | A1 |   | 8/2006 | Kimura et al. |
| 2009/0207051 | A1 | * | 8/2009 | Yamamoto et al. ............... 341/5 |

FOREIGN PATENT DOCUMENTS

JP 05-143219 6/1993

* cited by examiner

*Primary Examiner* — Lun-Yi Lao
*Assistant Examiner* — Tom Sheng
(74) *Attorney, Agent, or Firm* — RatnerPrestia

(57) ABSTRACT

A pressure sensitive conductive sheet is provided by having a plurality of ferromagnetic conductive particles dispersed in a transparent elastic member joined together and linearly aligned with the thickness direction thereby forming a linear aggregate and then having the linear aggregate segmented into a plurality conductive elements, held linearly aligned with the thickness direction, with predetermined gaps formed therebetween. Further, a touch panel having good transparency and allowing stabilized operation is provided by interposing the pressure sensitive conductive sheet between an upper conductive layer on the lower face of an upper substrate and a lower conductive layer on the upper face of a lower substrate.

3 Claims, 4 Drawing Sheets

PRESSURE SENSITIVE CONDUCTIVE SHEET, METHOD OF MANUFACTURING THE SAME, AND TOUCH PANEL USING THE SAME

This application is a continuation of U.S. patent application Ser. No. 11/313,197, filed Dec. 20, 2005, which is incorporated herein by reference.

TECHNICAL FIELD

The present invention relates to a pressure sensitive conductive sheet for use in input operation for various electronic apparatuses, a method of manufacturing the same, and a touch panel using the same.

BACKGROUND ART

In various electronic apparatuses such as mobile telephones and car navigation systems, such uses are prevalent in which, having a transparent touch panel (hereinafter referred to as TTP) mounted in front of a display device such as a liquid crystal display device, visual recognition or selection through the TTP, of characters and symbols displayed on the display device behind the TTP, is made and switching operation between various functions of the apparatuses is made with a push given onto the TTP with a finger, dedicated pen, or the like.

Such a TTP will be described with reference to FIGS. 4A and 4B. Incidentally, the drawings are given in expanded dimension in the thickness direction of the TTP for ease of understanding the configuration of the TTP.

FIG. 4A is a sectional view of a conventional TTP. Upper substrate 1 is made into a transparent film form. Lower substrate 3 is also made transparent. On the lower face of upper substrate 1, there is formed upper conductive layer 2 made of such a transparent material as indium tin oxide (ITO). Also on the upper face of lower substrate 3, there is formed a transparent lower conductive layer 4.

Between upper conductive layer 2 and lower conductive layer 4, there is sandwiched pressure sensitive conductive sheet (hereinafter referred to as PSCS) 5, which is transparent and of such a configuration that has a plurality of opaque conductive particles 7, having an average particle size of 50 μm, dispersed in elastic member 6 of transparent rubber or the like.

There are disposed a pair of upper electrodes (not shown) at both ends in one direction of upper conductive layer 2. Further, at both ends in the other direction of lower conductive layer 4, there are disposed a pair of lower electrodes (not shown) perpendicularly to the upper electrodes, and thus a TTP is constructed.

Such a TTP configured as described above is mounted on an electronic apparatus as disposed in front of a display device of a liquid crystal or the like, while the pairs of upper electrodes and lower electrodes are connected to electronic circuits (not shown) of the electronic apparatus.

In the above described configuration, if a predetermined position in the upper surface of upper substrate 1 is given a push with a finger, pen, or the like while a display on the display device behind the TTP is identified by sight, then upper substrate 1 is bent as shown in FIG. 4B, so that PSCS 5 is pressed down at the pushed position and the plurality of conductive particles 7 at the pushed position are brought closer to each other to come into contact with each other.

If a voltage is applied from the electronic circuit to the upper electrodes and the lower electrodes serially, the span between upper conductive layer 2 and lower conductive layer 4 at the pushed position conducts a current through the mutually contacted plurality of conductive particles 7. According to the ratios of voltages between these electrodes, the pushed position is detected by the electronic circuit and, thereby, various functions of the electronic apparatus are switched over. An example of a TTP configured as described above is disclosed in Japanese Patent Unexamined Publication No. H5-143219.

However, in the above TTP of a related are example, the average particle size of the opaque conductive particles 7 within elastic member 6 is a large as 50 μm. Therefore, when the added amount of conductive particles 7 is increased, the transparency of the pressure sensitive conductive sheet 5 is impaired and, hence it becomes difficult to visually recognize the display on the display device behind the TTP. When, in reverse, the added amount of conductive particles 7 is decreased, the distances between the dispersed conductive particle 7 become larger leading to unstable contacts between conductive particles 7 when a push operation is made. There has been involved such a problem in the related art.

SUMMARY OF THE INVENTION

The present invention addresses the provision of a pressure sensitive conductive sheet comprising: a transparent elastic member; and a plurality of ferromagnetic conductive particles dispersed in the elastic member, wherein the plurality of conductive particles form a linear aggregate having a plurality of conductive particles joined together and linearly aligned with a parallel direction to a surface of the elastic member, the linear aggregate is segmented into a configuration of a plurality of conductive elements, held linearly aligned with the perpendicular direction to surface of the elastic member, with predetermined gaps formed therebetween, and a plurality of configurations identical to the configuration of a plurality of conductive elements with predetermined gaps formed therebetween are disposed at predetermined intervals in a vertical direction to a surface of the elastic member.

Since the conductive elements are held linearly aligned with the perpendicular direction to a surface of the elastic member, transmissivity of light of the elastic member is not impaired and, hence, good transparency can be obtained. Further, the plurality of conductive elements can be readily contacted together by only a push corresponding to the gaps between the conductive elements. Thus, a pressure sensitive conductive sheet allowing a stabilized pushed operation can be provided by the elastic member.

Further, the present invention provides a method of manufacturing a pressure sensitive conductive sheet comprising: applying a magnetic field to a transparent elastic member with a plurality of ferromagnetic conductive particles dispersed therein in its perpendicular direction to a surface of the elastic member for causing the plurality of conductive particles to be joined together to thereby form a linear aggregate; curing the elastic member; and swelling the elastic member with use of a swelling liquid such that the linear aggregate is segmented into a plurality of conductive elements with predetermined gaps formed therebetween.

By formation of the linear aggregate of the conductive particles in the perpendicular direction to a surface of the elastic member achieved by application of a magnetic field and by formation of the conductive elements with predetermined gaps therebetween achieved by swelling of the elastic member, a pressure sensitive conductive sheet requiring only a small addition of conductive particles yet providing good transparency and allowing stabilized operation can be manufactured.

Further, the present invention provides a touch panel having the pressure sensitive conductive sheet of the present invention sandwiched between a transparent upper substrate having an upper conductive layer disposed on its lower face and a transparent lower substrate having a lower conductive layer, opposing the upper conductive layer with a distance spaced apart therefrom, disposed on its upper face. Thus, a touch panel having good transparency and allowing stabilized operation can be realized.

DETAILED DESCRIPTION OF THE PREFERRED EMBODIMENTS

Figure 3:
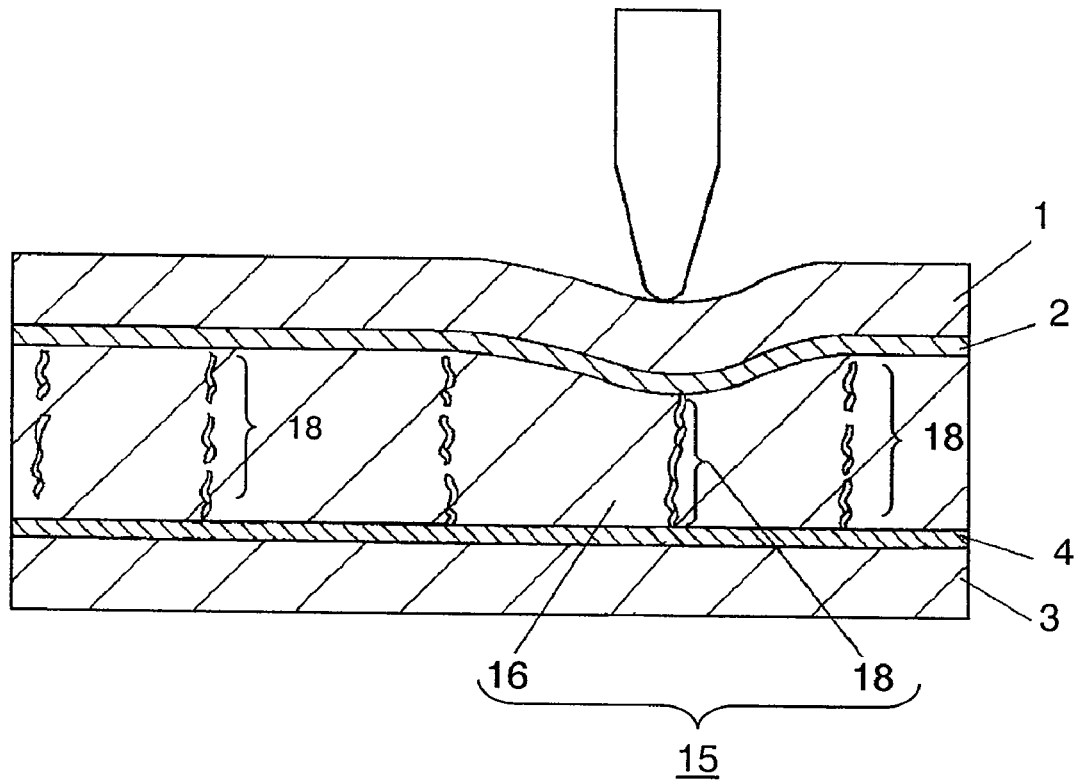
FIG. 3 is a sectional view of the TTP shown in FIG. 1 while it is operated.
Figure 4A:
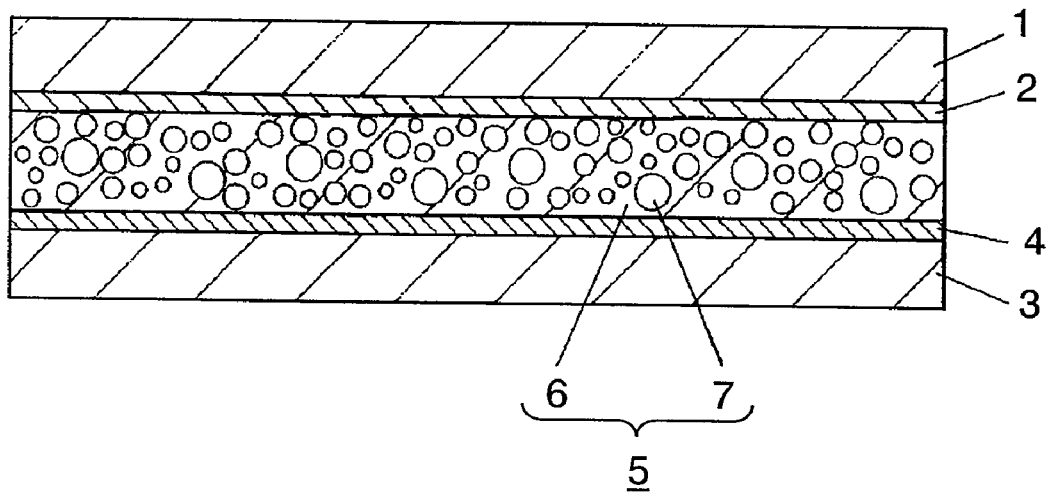
FIGS. 4A and 4B are sectional views of a TTP of related art.
Figure 4B:
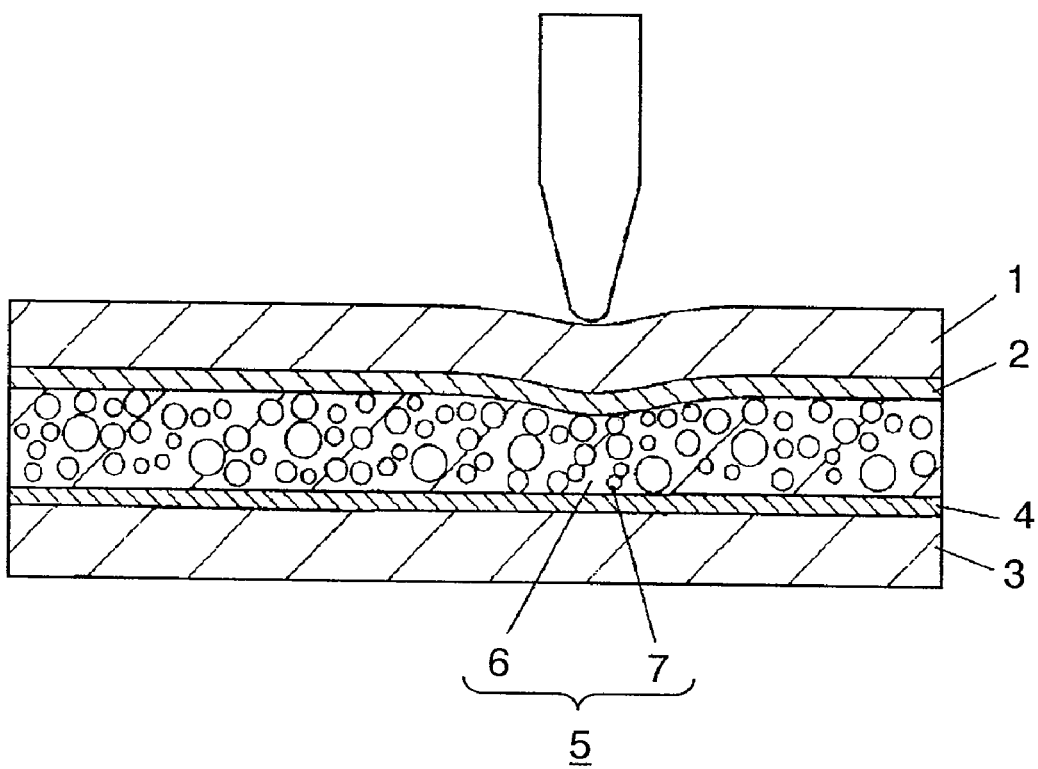

An embodiment of the present invention will be described with reference to FIG. 1. to FIG. 3. The drawings are just schematic diagrams and are not such that correctly show the relative positions of components and the like in accurate dimensions. In sectional views in these drawings, the dimension in the thickness direction is magnified for ease of understanding the configuration.

In the present invention, a thickness direction means a parallel direction to a surface of the elastic member, and a width direction means a vertical direction to a surface of the elastic member.

Further, like parts to those described in the section of the BACKGROUND ART will be denoted by corresponding reference marks and detailed description thereof may be omitted.

Exemplary Embodiment

Figure 1:
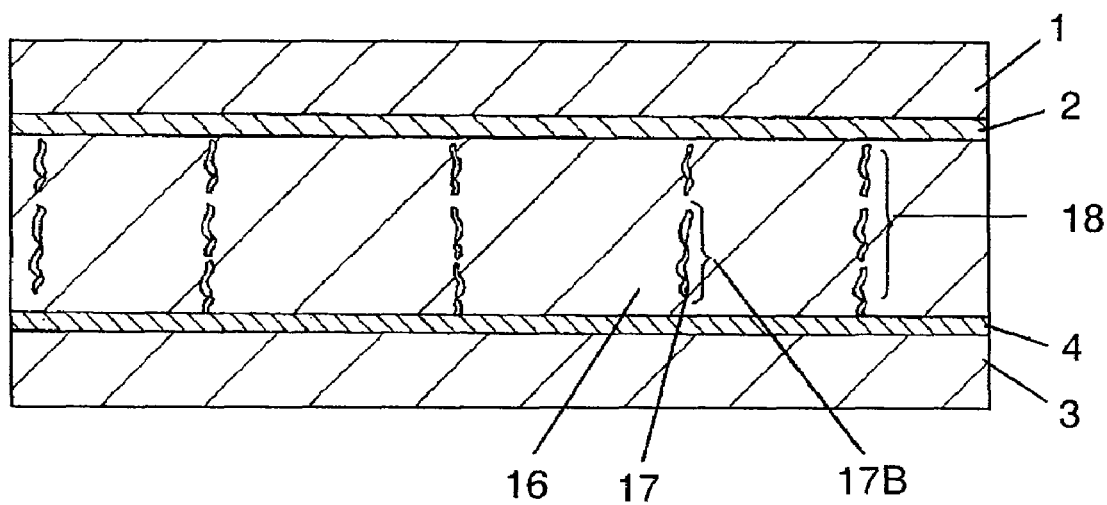
FIG. 1 is a sectional view of a TTP according to an embodiment of the present invention.

Transparent "pressure sensitive conductive sheet" (hereinafter called "PSCS") 15 shown in FIG. 1 is constructed as described below. A plurality of conductive particles 17 of a nickel, cobalt, iron, or the like, which are ferromagnetic conductive particles being opaque and having particle size between 10 and 1000 nm, are dispersed in elastic member 16 constitute of transparent silicone rubber or the like. Further, a magnetic field is applied to elastic member 16, whereby conductive particles 17 are joined together and linearly aligned with the thickness direction of elastic member 16 to provide linear aggregate 17B. By application of the magnetic field, a plurality of such linear aggregates 17B are formed as disposed at predetermined intervals in the width direction. Elastic member 16 is thereafter cured.

Then, linear aggregate 17B is swollen by being dipped in swelling liquid, whereby linear aggregate 17B is segmented into a plurality of conductive elements 18, held linearly aligned with the thickness direction, with a plurality of gaps formed therebetween. With a plurality of configurations the same as the configuration of the above described plurality of conductive elements 18 having gaps therebetween disposed in the width direction, PSCS 15 is constructed.

Upper substrate 1 is formed into a transparent film form of PET, polycarbonate (PC), or the like. Lower substrate 3 is transparent and formed of glass, acrylic, PC, or the like. On the lower face of upper substrate 1, there is formed upper conductive layer 2 of ITO, tin oxide, or the like, and on the upper face of lower substrate 3, there is formed lower conductive layer 4 of the same corn position.

Between upper conductive layer 2 and lower conductive layer 4, there is interposed PSCS 15. further, a pair of upper electrodes (not shown) of silver, carbon, or the like are formed at both ends of upper conductive layer 2, and at both ends orthogonal to the above referred ends of lower conductive layer 4, there are formed a pair of lower electrodes (not shown), both the electrodes being provided by printing or the like. Thus, a touch panel is constructed.

A method of manufacturing PSCS 15 configured as above will be described with reference to FIGS. 2A to 2C.

Figure 2A:
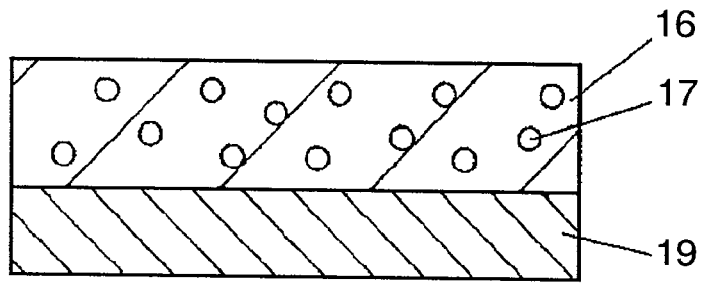
FIGS. 2A and 2C are sectional views showing a method of manufacturing the TTP shown in FIG. 1.

By coating the upper face of a sheet-formed supporting member 19 with transparent silicone rubber or the like, with 0.0001 to 1% by volume of a plurality of conductive particles 17 of nickel, cobalt, iron, or the like dispersed therein, as shown in FIG. 2A, elastic member 16 in a sheet form is produced.

Figure 2B:
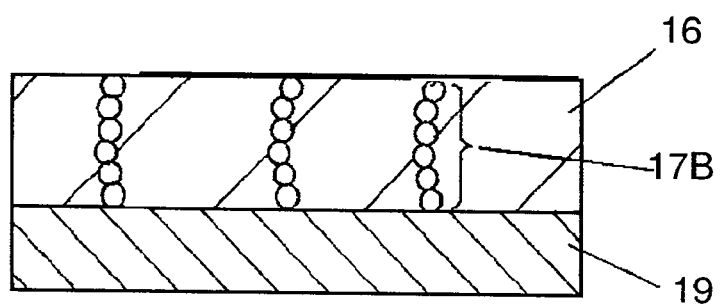
Figure 2C:
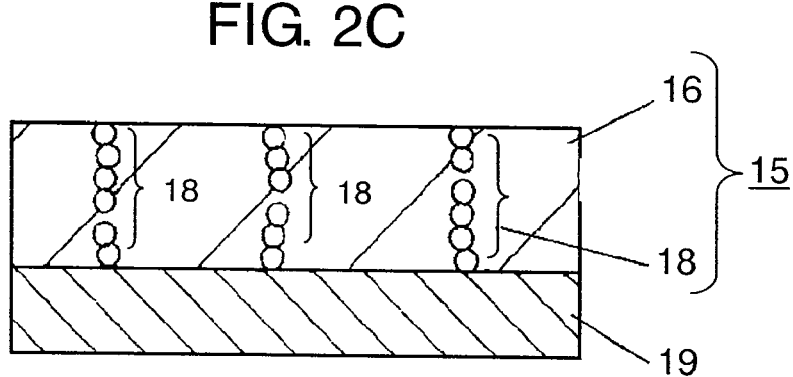

Then, as shown in FIG. 2B, a magnetic field is applied to elastic member 16 in its thickness direction with use of an electromagnet or the like. Thus, linear aggregate 17B having a plurality of conductive particles 17 joined together and linearly aligned with the thickness direction is formed and, thereupon, elastic member 16 is cured. A plurality of such linear aggregates 17B are produced at the same time so as to be disposed at predetermined intervals in the width direction.

Thereafter, elastic member 16 is swollen by being dipped in a swelling liquid such ad dibutyl phthalate, diesel oil, or the like. Thereby, linear aggregate 17B is segmented into a plurality of conductive elements 18, held linearly aligned with the thickness direction, having predetermined gaps formed therebetween as shown in FIG. 2C. Then, elastic member 16 is removed from supporting member 19. With a plurality of configurations the same as the configuration of the above described plurality of conductive elements 18 having gaps therebetween disposed at predetermined intervals in the width direction, PSCS 15 is constructed. The predetermined intervals are in accordance with product standards.

By adapting the particle size of conductive particles 17 dispersed in elastic member 16 to be 10 to 1000 nm, conductive particles 17 can be produced relatively easily. Further, transparency of elastic member 16 can be prevented from being impaired by opaque conductive particles 17 and, thus, good transparency can be provided.

The particle size of ferromagnetic conductive particles 17 are greater than the size of particle which shows upper paramagnetism behavior. The particle size of conductive particles 17 exceeding 1000 nm impair transparency of elastic member 16. The additive quantity of the conductive particles 17 relative to elastic member 16 is set at 0.0001 to 1% by volume, or preferably, at 0.05 to 1.0% by volume. Thereby, predetermined gaps can be secured between the plurality of conductive elements 18 linearly aligned with the thickness direction so that good transparency can be attained.

The additive quantity of conductive particles 17 of less than 0.0001% by volume impairs good conductivity. When the additive quantity of conductive particles 17 exceeds 1.0% by volume, it is difficult to form predetermined gaps between the plurality of conductive elements 18 by swelling of elastic member 16.

Further, depending on quality of the materials of elastic member 16 and the swelling liquid, the rate of volume swelling of elastic member 16, when it is dipped in the liquid, varies, and accordingly, the gaps between the plurality of conductive elements 18 linearly aligned with the thickness direction is also varied. Therefore, by setting the rate of volume swelling at 4 to 100% by volume, or preferably at 15 to 30% by volume, the gaps between conductive elements 18 can be controlled and conductive elements 18 can be easily arranged to have predetermined gaps therebetween.

A TTP is constructed by interposing PSCS 15 between upper substrate 1 with upper conductive layer 2 formed on it slower face and lower substrate 3 with lower conductive layer 4 formed on its upper face. Then, the TTP is mounted on an electronic apparatus by being disposed on the front side of a display device of a liquid crystal display or the like. Thereafter, pairs of upper electrodes and lower electrodes are connected with an electronic circuit (not shown) of the electronic apparatus.

In the above described configuration, if the user pushes a predetermined position in the upper face of upper substrate 1 with a finger, pen, or the like while recognizing a display on the display device behind the TTP, the following phenomena occur. That is, as shown in FIG. 3, upper substrate 1 is bent and PSCS 15 at the pushed position is compressed, so that the plurality of conductive elements 18 linearly aligned with elastic member 16 with predetermined gaps therebetween are brought closer to come into contact with each other.

Then, if a voltage from the electronic circuit is impressed on the upper substrate and the lower substrate serially, the span between upper conductive layer 2 and lower conductive layer 4 at the pushed position conducts a current through the mutually contacted plurality of conductive elements 18. The pushed position is detected by the electronic circuit in accordance with the voltage ratios between these electrodes and thereby switching between various functions of the electronic apparatus can be performed.

At this time, there are present, in elastic member 16 of PSCS 15, a plurality of conductive elements 18, each thereof being formed of conductive particles 17 of small particle size joined together and linearly aligned with the thickness direction. Hence, only by pushing a stroke corresponding to the gaps between conductive elements 18, the plurality of conductive elements 18 can be easily brought into contact with each other, while the transparency of elastic member 16 is not impaired and good transparency is provided.

According to the present embodiment as described in the foregoing, PSCS 15 having good transparency and allowing stabilized operation can be easily manufactured with a small additive quantity of conductive particles 17.

Further, PSCS 15 is interposed between upper conductive layer 2 of upper substrate 1 and lower conductive layer 4 of lower substrate 3 such that no opening is formed between upper conductive layer 2 and lower conductive layer 4. As a result, even when ambient light such as sunlight and lamplight is incident, there is scarcely produced reflection of light, production of Newton ring, and the like, and accordingly the display on the display device or the like behind the TTP can be clearly recognized by vision.

Furthermore, since it is adapted such that no direct contact takes place between upper conductive layer 2 and lower conductive layer 4, and further since the bending of upper substrate 1 can be kept small, wear and tear on upper conductive layer 2 due to repeated pushing operations with a finger, pen, or the like can be reduced and thus a touch panel having a long service life can be realized.

Since PSCS and TTP using the same according to the present invention have good transparency and allow stabilized operation, they are widely applicable to input devices of various electronic apparatuses.

What is claimed is:

1. A pressure sensitive conductive sheet comprising:
   a transparent elastic member; and
   a plurality of ferromagnetic conductive particles dispersed in the elastic member, wherein
   the plurality of conductive particles form a linear aggregate having a plurality of conductive particles joined together and linearly aligned with a perpendicular direction to a surface of the elastic member,
   the linear aggregate is segmented into a configuration of a plurality of conductive elements, held linearly aligned with the perpendicular direction to a surface of the elastic member, with predetermined gaps formed therebetween, and
   a plurality of configurations identical to the configuration of a plurality of conductive elements are disposed at predetermined intervals in a parallel direction to a surface of the elastic member.

2. The pressure sensitive conductive sheet according to claim 1, wherein the additive rates of the conductive particles to the elastic member are between 0.0001 to 1% volume.

3. A touch panel comprising:
   a transparent upper substrate having an upper conductive layer formed on its lower face;
   a transparent lower substrate having a lower conductive layer, opposed to the upper conductive layer across a predetermined space, formed on its upper face; and
   the pressure sensitive conductive sheet set forth in claim 1 interposed between the upper substrate and the lower substrate.

* * * * *